(12) United States Patent
Suyama et al.

(10) Patent No.: US 9,099,694 B2
(45) Date of Patent: Aug. 4, 2015

(54) METHOD OF MANUFACTURING ELECTRODE BODY

(75) Inventors: Hiroshi Suyama, Mishima (JP); Shigenori Hama, Susono (JP); Satoshi Wakasugi, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/885,210

(22) PCT Filed: Dec. 8, 2010

(86) PCT No.: PCT/JP2010/072024
§ 371 (c)(1),
(2), (4) Date: May 14, 2013

(87) PCT Pub. No.: WO2012/077197
PCT Pub. Date: Jun. 14, 2012

(65) Prior Publication Data
US 2013/0260023 A1    Oct. 3, 2013

(51) Int. Cl.
*B05D 5/12*     (2006.01)
*H01M 4/04*    (2006.01)
*H01M 4/139*   (2010.01)
*H01M 10/0562* (2010.01)
(Continued)

(52) U.S. Cl.
CPC .......... *H01M 4/0402* (2013.01); *H01M 4/0404* (2013.01); *H01M 4/139* (2013.01); *H01M 4/622* (2013.01); *H01M 10/0562* (2013.01); *H01M 2/1673* (2013.01); *Y02E 60/122* (2013.01)

(58) Field of Classification Search
USPC ............................ 427/115, 126.1, 372.2, 402
See application file for complete search history.

(56) References Cited

U.S. PATENT DOCUMENTS

| 7,968,233 | B2 * | 6/2011 | Nelson et al. | 429/231.95 |
| 2006/0286458 | A1 * | 12/2006 | Sato et al. | 429/231.95 |

(Continued)

FOREIGN PATENT DOCUMENTS

| CN | 101132062 A | 2/2008 |
| JP | A-1-115069  | 5/1989 |

(Continued)

OTHER PUBLICATIONS

Inada et al. "All Solid State sheet battery using lithium inorganic solid electrolyte thio-LISICON", Journal of Power Sources, vol. 194, pp. 1085-1088 (2009).*

(Continued)

*Primary Examiner* — Brian K Talbot
(74) *Attorney, Agent, or Firm* — Oliff PLC (57) ABSTRACT

A method of manufacturing an electrode body having a pair of electrode layers and an electrolyte layer disposed between the pair of electrode layers, by which an electrode body with reduced internal resistance can be manufactured, the method including the steps of: dispersing at least an active material capable of releasing or absorbing and releasing a metal ion, an electrolyte having conductivity for the metal ion, and a binder into a solvent, to prepare an electrode slurry, and applying the electrode slurry onto a base material, thereby forming a sheet-shaped electrode layer containing the binder; and dispersing at least an electrolyte having ion conductivity for the metal ion into a solvent to prepare an electrolyte slurry, and applying the electrolyte slurry onto the electrode layer, thereby forming a sheet-shaped electrolyte layer on the electrode layer.

4 Claims, 5 Drawing Sheets

(51) Int. Cl.
*H01M 4/62* (2006.01)
*H01M 2/16* (2006.01)

(56) References Cited

U.S. PATENT DOCUMENTS

| | | |
|---|---|---|
| 2011/0065000 A1* | 3/2011 | Chang et al. .................. 429/212 |
| 2011/0070501 A1* | 3/2011 | Chang et al. .................. 429/232 |
| 2011/0076570 A1* | 3/2011 | Hama et al. ................... 429/306 |
| 2011/0091775 A1* | 4/2011 | Lee et al. ...................... 429/331 |
| 2011/0293977 A1* | 12/2011 | Kim et al. ....................... 429/94 |
| 2012/0110835 A1* | 5/2012 | Hudson et al. ............... 29/623.1 |

FOREIGN PATENT DOCUMENTS

| | | |
|---|---|---|
| JP | A-2-114459 | 4/1990 |
| JP | A-2002-203603 | 7/2002 |
| JP | A-2010-33918 | 2/2010 |
| JP | A-2010-55811 | 3/2010 |
| JP | A-2010-212058 | 9/2010 |

OTHER PUBLICATIONS

Inada et al., "All solid-state sheet battery using lithium inorganic solid electrolyte, thio-LISICON," Journal of Power Sources, vol. 194, pp. 1085-1088, (2009).

* cited by examiner

METHOD OF MANUFACTURING ELECTRODE BODY

TECHNICAL FIELD

The present invention relates to a method of manufacturing an electrode body to be used for solid batteries and the like, the electrode body having a pair of electrode layers and an electrolyte layer disposed between the pair of electrode layers.

BACKGROUND ART

The lithium-ion secondary battery (hereinafter sometimes referred to as "lithium battery") has a characteristic that it has a higher energy density than other secondary batteries and can be operated at a high voltage. Therefore, it is used for information devices such as cellular phones as it can be easily reduced in size and weight; and nowadays there are increasing demands for the lithium-ion secondary battery to be used as a power source for large-scale apparatuses such as electric vehicles and hybrid vehicles.

The lithium-ion secondary battery has a cathode layer, an anode layer, and an electrolyte layer disposed therebetween. An electrolyte to be provided in the electrolyte layer is for example a non-aqueous liquid electrolyte or a solid electrolyte. If a liquid (hereinafter referred to as an "electrolytic solution") is used as the electrolyte, it easily permeates into the cathode layer and the anode layer. Therefore, an interface can be easily formed between the electrolytic solution and active materials contained in the cathode layer and the anode layer, and the performance of the battery can be easily improved. However, since commonly used electrolytic solutions are flammable, it is necessary to mount a system to ensure safety. On the other hand, solid electrolytes are nonflammable, thus allowing simplification of the above system. As such, there has been suggested a lithium-ion secondary battery having a layer containing a solid electrolyte, which is nonflammable, (hereinafter, the layer is referred to as a "solid electrolyte layer", and the battery is referred to as a "solid battery").

As a technique related to such a solid battery, Patent Document 1 for example discloses a method of manufacturing a lithium battery, the method including the steps of: dispersing an active material into a solvent containing a lithium ion conducting binder, thereby preparing an active material slurry; dispersing sulfide solid electrolyte into a solvent containing a lithium ion conducting binder, thereby preparing a solid electrolyte slurry; dripping the active material slurry and the solid electrolyte slurry onto a substrate, adjusting the thickness of the slurries by a blade, and further heat-drying and peeling the slurries, thereby forming an active material sheet and a solid electrolyte sheet; sandwiching the solid electrolyte sheet by two active material sheets and further sandwiching the two active material sheets by two current collector sheets, thereby forming a laminated body; and performing vacuum hot-pressing on the laminated body at a temperature no less than the melting point of the lithium ion conducting binder.

CITATION LIST

Patent Literature

Patent Document 1: Japanese Patent Application Laid-Open (JP-A) No. 2010-33918

SUMMARY OF THE INVENTION

Problems to be Solved by the Invention

According to the technique disclosed in Patent Document 1, it is seen that the thickness of the sheet to constitute the lithium battery can be adjusted to a desired thickness. However, as described in Patent Document 1, if the lithium battery is manufactured through the process of laminating the active material sheets and the solid electrolyte sheet formed by the heat-drying and the peeling, and then hot-pressing the laminated body thus obtained, there will be insufficient adhesion between the solid electrolyte sheet and the active material sheets. As such, the lithium battery manufactured by the method disclosed in Patent Document 1 has a drawback that its internal resistance tends to increase.

Accordingly, an object of the present invention is to provide a method of manufacturing an electrode body by which an electrode body with reduced internal resistance can be manufactured.

Means for Solving the Problems

In order to solve the above problems, the present invention takes the following means.

Namely, a first aspect of the present invention is a method of manufacturing an electrode body having a pair of electrode layers and an electrolyte layer disposed between the pair of electrode layers, the method including: an electrode layer forming step of dispersing at least an active material capable of releasing or absorbing and releasing a metal ion, an electrolyte having conductivity for the metal ion, and a binder into a solvent, to prepare an electrode slurry, and applying the electrode slurry onto a base material, thereby forming a sheet-shaped electrode layer containing the binder; and an electrolyte layer forming step of dispersing at least an electrolyte having ion conductivity for the metal ion into a solvent to prepare an electrolyte slurry, and applying the electrolyte slurry onto a surface of the electrode layer, thereby forming a sheet-shaped electrolyte layer on the surface of the electrode layer.

In the first aspect of the present invention, the method of manufacturing an electrode body may further include a step of removing the solvent contained in the electrode layer by drying the electrode layer, between the electrode layer forming step and the electrolyte layer forming step.

A second aspect of the present invention is a method of manufacturing an electrode body having a pair of electrode layers and an electrolyte layer disposed between the pair of electrode layers, the method including: an electrolyte layer forming step of dispersing at least a binder and an electrolyte having metal ion conductivity into a solvent, to prepare an electrolyte slurry, and applying the electrolyte slurry onto a base material, thereby forming a sheet-shaped electrolyte layer containing the binder; and an electrode layer forming step of dispersing at least an active material capable of releasing or absorbing and releasing the metal ion, and an electrolyte having ion conductivity for the metal ion into a solvent, to prepare an electrode slurry, and applying the electrode slurry onto a surface of the electrolyte layer, thereby forming a sheet-shaped electrode layer on the surface of the electrolyte layer.

In the second aspect of the present invention, the method of manufacturing an electrode body may further include a step of removing the solvent contained in the electrolyte layer by drying the electrolyte layer, between the electrolyte layer forming step and the electrode layer forming step.

In the first and the second aspects of the present invention, the binder may be butylene rubber.

Effects of the Invention

In the first aspect of the present invention, the electrolyte slurry is applied onto the surface of the sheet-shaped electrode layer containing the binder, thereby forming the electrolyte layer onto the surface of the electrode layer. By this configuration, the binder contained in the electrode layer on which the electrolyte slurry is applied absorbs the solvent contained in the electrolyte slurry and expands. When the binder contained in the electrode layer expands, one end of some of the binder that has expanded flows into the electrolyte slurry, therefore enabling the electrode layer and the electrolyte layer to bond with each other via the binder that has expanded. Even if the solvent is removed by drying the electrode layer and the electrolyte layer that are bonded with each other in this way, the electrode layer and the electrolyte layer can be bonded with each other via the binder that has shrunk, therefore enabling improvement of the adhesion between the electrode layer and the electrolyte layer. Herein, improving the adhesion between the electrode layer and the electrolyte layer makes it possible to reduce the moving resistance of a substance at the interface between the electrode layer and the electrolyte layer. Therefore, according to the first aspect of the present invention, it is possible to provide a method of manufacturing an electrode body by which an electrode body with reduced internal resistance can be manufactured.

In the first aspect of the present invention, with the step of removing the solvent included between the step of forming the electrode layer and the step of forming the electrolyte layer, it is not only possible to achieve the above advantageous effects but also possible to easily shape the electrode layer.

In the second aspect of the present invention, the electrode slurry is applied onto the surface of the sheet-shaped electrolyte layer containing the binder, thereby forming the electrode layer onto the surface of the electrolyte layer. By this configuration, the binder contained in the electrolyte layer on which the electrode slurry is applied absorbs the solvent contained in the electrode slurry and expands. When the binder contained in the electrolyte layer expands, one end of some of the binder that has expanded flows into the electrode slurry, therefore enabling the electrolyte layer and the electrode layer to bond with each other via the binder that has expanded. Even if the solvent is removed by drying the electrolyte layer and the electrode layer that are bonded with each other in this way, the electrolyte layer and the electrode layer can be bonded with each other via the binder that has shrunk, therefore enabling improvement of the adhesion between the electrolyte layer and the electrode layer. Therefore, according to the second aspect of the present invention, it is possible to provide a method of manufacturing an electrode body by which an electrode body with reduced internal resistance can be manufactured.

In the second aspect of the present invention, with the step of removing the solvent included between the step of forming the electrolyte layer and the step of forming the electrode layer, it is not only possible to achieve the above advantageous effects but also possible to easily shape the electrolyte layer.

Further in the first and the second aspects of the present invention, by using butylene rubber as the binder, it is possible to provide a method of manufacturing an electrode body by which an electrode body with reduced internal resistance can be easily manufactured.

MODE FOR CARRYING OUT THE INVENTION

Hereinafter, the embodiments of manufacturing an electrode body for a lithium-ion secondary battery by the method of manufacturing an electrode body of the present invention will be described with reference to the drawings. It should be noted, however, that the embodiments shown below are examples of the present invention and that the present invention is not limited to these embodiments.

Figure 1:
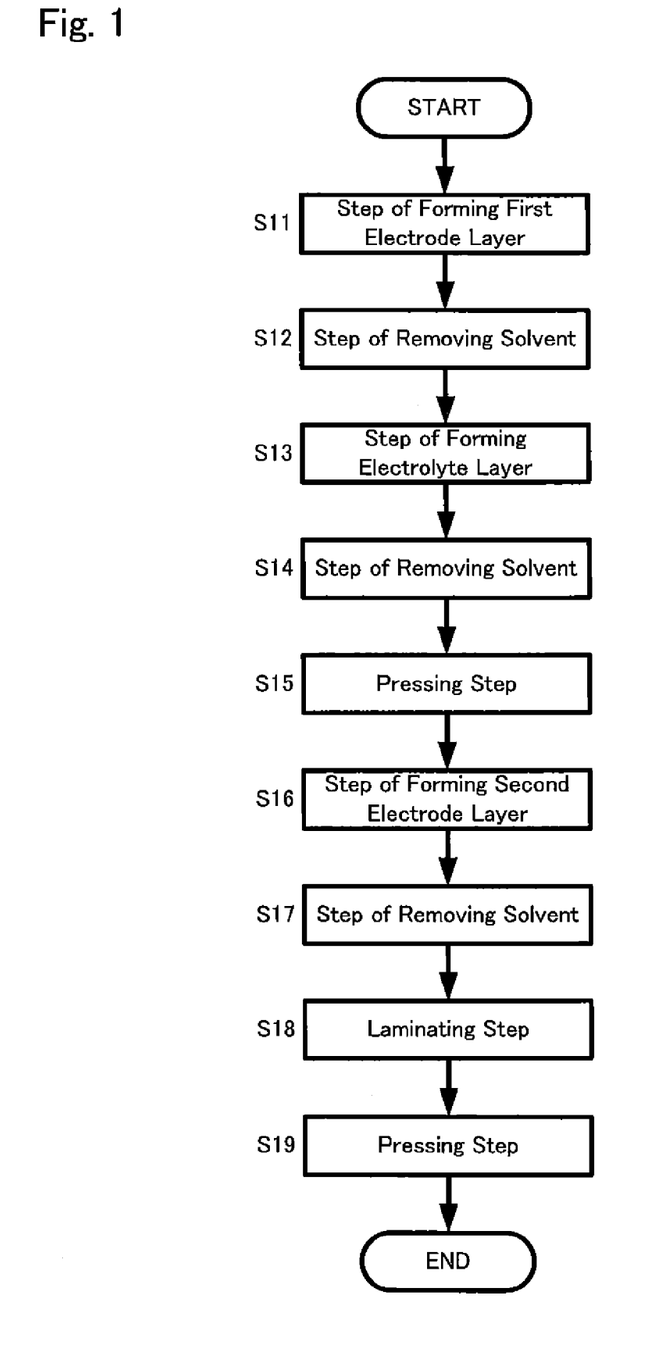
FIG. 1 is a flowchart showing a first embodiment of the method of manufacturing an electrode body of the present invention.

FIG. 1 is a flowchart showing the first embodiment of the method of manufacturing an electrode body of the present invention (hereinafter sometimes referred to a "manufacturing method of the first embodiment"). As shown in FIG. 1, the manufacturing method of the first embodiment includes: a step S11 of forming a first electrode layer; a step S12 of removing a solvent; a step S13 of forming an electrolyte layer; a step S14 of removing a solvent; a pressing step S15; a step S16 of forming a second electrode layer; a step S17 of removing a solvent; a laminating step S18; and a pressing step S19.

The step S11 (hereinafter simply referred to as "S11") is a step of forming a first electrode layer to constitute an electrode body (the first electrode layer being a sheet-shaped first electrode layer, and hereinafter being referred to as a "cathode layer" in the descriptions of the manufacturing method of the first embodiment). S11 includes the steps of: dispersing an active material capable of absorbing and releasing lithium ions, an electrolyte having lithium ion conductivity, and a binder into a solvent, thereby preparing a first electrode slurry; and applying the first electrode slurry thus prepared onto a base material.

In S11, the active material may be adequately selected from known active materials that can be contained in the cathode layer of the lithium-ion secondary battery. Examples of the active material include lithium cobalt oxide ($LiCoO_2$). In S11, the electrolyte may be adequately selected from known electrolytes that can be contained in the cathode layer of the lithium-ion secondary battery. Examples of the electrolyte include: oxide solid electrolytes such as $Li_3PO_4$; $Li_3PS_4$; and a sulfide solid electrolyte made by mixing $Li_2S$ and $P_2S_5$ such that the ratio thereof is $Li_2S:P_2S_5$=50:50 to 100:0 (for example a sulfide solid electrolyte made by mixing $Li_2S$ and $P_2S_5$ such that the ratio thereof is $Li_2S:P_2S_5$=75:25 at a mass ratio). In S11, the binder may be adequately selected from known binders that can be used for making the cathode layer of the lithium-ion secondary battery. Examples of the binder include: butylene rubber; polyvinylidene fluoride (PVDF);

and styrene-butadiene rubber (SBR). In S11, the solvent may be adequately selected from known solvents that can be used for preparing a slurry to be used in making the cathode layer of the lithium-ion secondary battery. Examples of the solvent include: heptane; toluene; and dibutyl ether. In S11, the base material on which to apply the first electrode slurry may be adequately selected from known base materials that can be used in forming the cathode layer of the lithium-ion secondary battery. It is preferable to employ, as the base material, for example a known metal foil which can also serve as a cathode current collector, a typical example of such a metal foil being an aluminum foil. In S11, the method of applying the first electrode slurry is not particularly limited as long as it is a method that can be employed in applying a slurry. For example, a known method such as a doctor-blade method can be employed.

The step S12 (hereinafter simply referred to as "S12") is a step of removing the solvent contained in the first electrode slurry that has been applied onto the base material in S11. Removing the solvent makes it possible to shape the cathode layer easily. In the manufacturing method of the first embodiment, the configuration of S12 is not particularly limited as long as the step enables removal of the solvent. For example, S12 can be a step of holding the base material on which the first electrode slurry has been applied, for 60 minutes at 120° C. under atmospheric pressure.

The step S13 (hereinafter simply referred to as "S13") is a step of forming an electrolyte layer to constitute an electrode body on a surface of the cathode layer from which the solvent has been removed in S12, (the electrolyte layer being a sheet-shaped electrolyte layer, hereinafter being referred to as a "solid electrolyte layer" in the descriptions of the manufacturing method of the first embodiment). S13 includes the steps of: dispersing an electrolyte having lithium ion conductivity and a binder into a solvent, thereby preparing an electrolyte slurry; and applying the electrolyte slurry thus prepared onto the surface of the cathode layer.

In S13, the electrolyte may be adequately selected from known electrolytes that can be contained in the solid electrolyte layer of the lithium-ion secondary battery. Examples of the electrolyte include: oxide solid electrolytes such as $Li_3PO_4$; $Li_3PS_4$; and a sulfide solid electrolyte made by mixing $Li_2S$ and $P_2S_5$ such that the ratio thereof is $Li_2S:P_2S_5$=50:50 to 100:0 (for example a sulfide solid electrolyte made by mixing $Li_2S$ and $P_2S_5$ such that the ratio thereof is $Li_2S:P_2S_5$=75:25 at a mass ratio). In S13, the binder may be adequately selected from known binders that can be used for making the solid electrolyte layer of the lithium-ion secondary battery. Examples of the binder include: butylene rubber; polyvinylidene fluoride (PVDF); and styrene-butadiene rubber (SBR). In S13, the solvent may be adequately selected from known solvents that can be used for preparing a slurry to be used in making the solid electrolyte layer of the lithium-ion secondary battery. Examples of the solvent include: heptane; toluene; and dibutyl ether. In S13, the method of applying the electrolyte slurry is not particularly limited as long as it is a method that can be employed in applying a slurry. For example, a known method such as a doctor-blade method can be employed.

The step S14 (hereinafter simply referred to as "S14") is a step of removing the solvent contained in the electrolyte slurry that has been applied onto the surface of the cathode layer in S13. Removing the solvent makes it possible to shape the electrolyte layer easily. In the manufacturing method of the first embodiment, the configuration of S14 is not particularly limited as long as the step enables removal of the solvent. For example, S14 can be a step of holding a structure having the electrolyte slurry that has been applied onto the surface of the cathode layer, for 60 minutes at 120° C. under atmospheric pressure.

The step S15 (hereinafter simply referred to as "S15") is a step of pressing the cathode layer and the solid electrolyte layer formed on/above the base material, the solvent having been removed in S14, in a lamination direction of the cathode layer and the solid electrolyte layer. By pressing the cathode layer and the solid electrolyte layer, it is possible to easily improve the adhesion between the base material and the cathode layer and the adhesion between the cathode layer and the solid electrolyte layer. In the manufacturing method of the first embodiment, the pressure to be applied to the cathode layer and the solid electrolyte layer in S15 is not particularly limited. It may be for example 50 MPa or more and 400 MPa or less. Further, in the manufacturing method of the first embodiment, the time to apply the pressure (pressing time) in S15 is also not particularly limited. It may be for example 5 seconds or more and 300 seconds or less.

The step S16 (hereinafter simply referred to as "316") is a step of forming a second electrode layer to constitute an electrode body (the second electrode layer being a sheet-shaped second electrode layer, hereinafter being referred to as an "anode layer" in the descriptions of the manufacturing method of the first embodiment). S16 includes the steps of: dispersing an active material capable of absorbing and releasing lithium ions, an electrolyte having lithium ion conductivity, and a binder into a solvent, thereby preparing a second electrode slurry; and applying the second electrode slurry thus prepared onto a base material.

In S16, the active material may be adequately selected from known active materials that can be contained in the anode layer of the lithium-ion secondary battery. Examples of the active material include graphite. In S16, the electrolyte may be adequately selected from known electrolytes that can be contained in the anode layer of the lithium-ion secondary battery. Examples of the electrolyte may be those that can be employed in S11. In S16, the binder and the solvent may be adequately selected from known binders and known solvents respectively that can be used in making the anode layer of the lithium-ion secondary battery. Examples of the binder and the solvent may be those that can be employed in S11. In S16, the base material on which to apply the second electrode slurry may be adequately selected from known base materials that can be used in forming the anode layer of the lithium-ion secondary battery. It is preferable to employ, as the base material, for example a known metal foil which can also serve as an anode current collector, a typical example of such a metal foil being a copper foil. In S16, the method of applying the second electrode slurry is not particularly limited as long as it is a method that can be employed in applying a slurry. For example, a known method such as a doctor-blade method can be employed.

The step S17 (hereinafter simply referred to as "S17") is a step of removing the solvent contained in the second electrode slurry that has been applied onto the base material in S16. Removing the solvent makes it possible to shape the anode layer easily. In the manufacturing method of the first embodiment, the configuration of S17 is not particularly limited as long as the step enables removal of the solvent. For example, S17 can be a step of holding the base material on which the second electrode slurry has been applied, for 60 minutes at 120° C. under atmospheric pressure.

Figure 2:
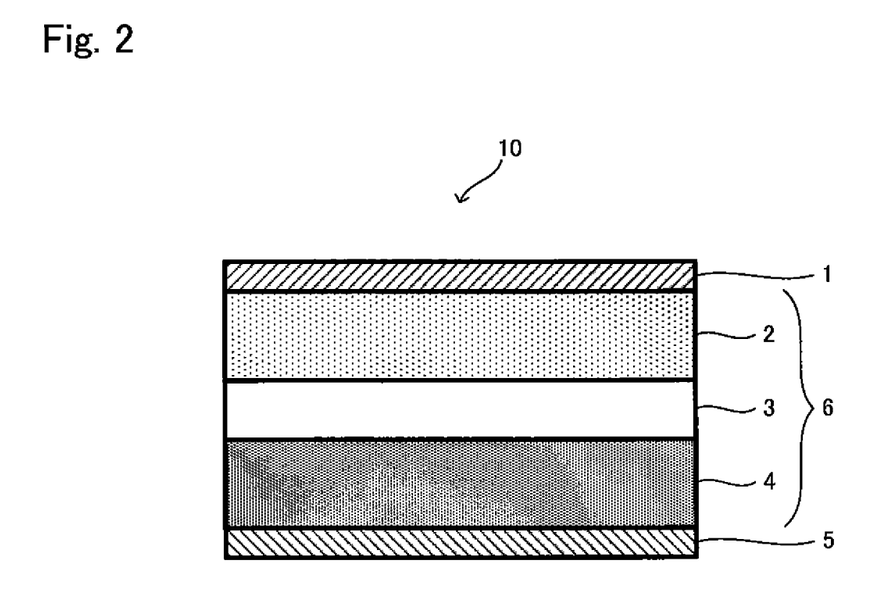
FIG. 2 is a cross-sectional view describing a laminated body 10.

The step S18 (hereinafter simply referred to as "S18") is a step of laminating the cathode layer, the solid electrolyte layer, and the anode layer in such a manner that the solid electrolyte layer pressed in S15 is sandwiched by the cathode layer also pressed in S15 and the anode layer from which the solvent has been removed in S17. When the cathode layer is formed by applying the first electrode slurry onto a surface of an aluminum foil in S11 and the anode layer is formed by applying the second electrode slurry onto a surface of a copper foil in S16, a laminated body formed in S18 will be as shown in FIG. 2. The laminated body 10 shown in FIG. 2 has: an aluminum foil 1; a cathode layer 2 formed on a surface of the aluminum foil 1; a solid electrolyte layer 3 formed on the surface of the cathode layer 2; an anode layer 4 arranged on the surface of the solid electrolyte layer 3; and a copper foil 5 arranged on the surface of the anode layer 4. In the laminated body 10 which has an electrode body 6 constituted by the cathode layer 2, the anode layer 4, and the solid electrolyte layer 3 between the cathode layer 2 and the anode layer 4, the aluminum foil 1 serves as a cathode current collector, and the copper foil 5 serves as an anode current collector. The laminated body 10 formed in this manner will be pressed in the pressing step S19 described below, accommodated into a known exterior material, sealed, and so on, thereby forming a lithium-ion secondary battery.

The step S19 (hereinafter simply referred to as "S19") is a step of pressing the laminated body 10 formed in S18 in the lamination direction of the cathode layer 2, the solid electrolyte layer 3, and the anode layer 4 (in a top/down direction of the drawing sheet of FIG. 2). Pressing the laminated body 10 not only makes it possible to easily improve the adhesion between the copper foil 5 and the anode layer 4 and the adhesion between the anode layer 4 and the solid electrolyte layer 3, but also makes it possible to easily improve the adhesion between the aluminum foil 1 and the cathode layer 2 and the adhesion between the cathode layer 2 and the solid electrolyte layer 3. In the manufacturing method of the first embodiment, the pressure to be applied to the laminated body 10 in S19 is not particularly limited as long as it is sufficient to improve the adhesion between the base material and the layer adjacent to each other and the adhesion between the adjacent layers. It may be for example 100 MPa or more and 600 MPa or less. In the manufacturing method of the first embodiment, the time to apply the pressure (pressing time) in S19 is also not particularly limited. It may be for example 5 seconds or more and 300 seconds or less.

Figure 3A:
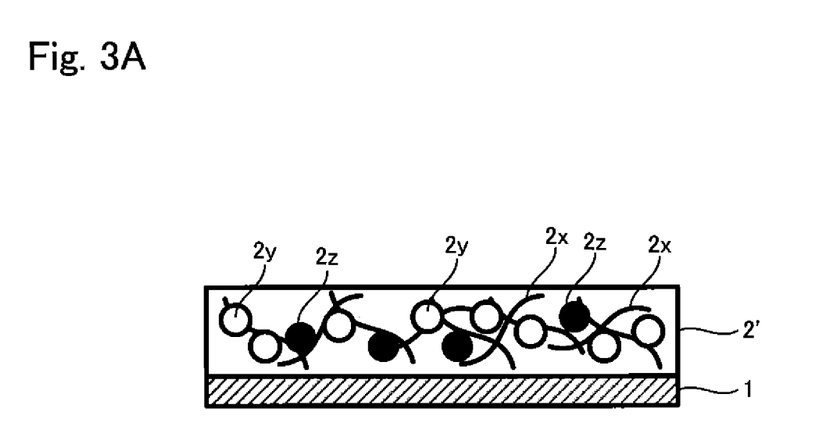
FIG. 3A is a cross-sectional view of a cathode layer 2' and a base material 1.
Figure 3B:
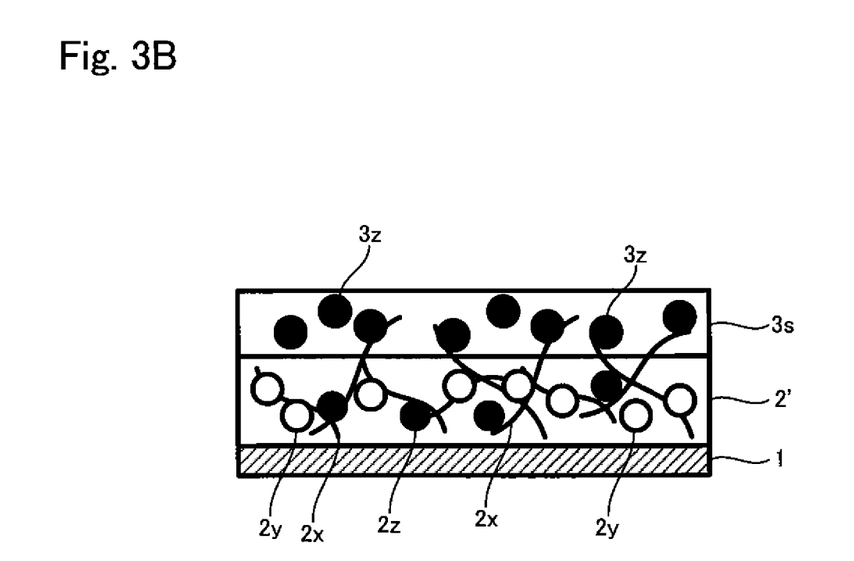
FIG. 3B is a cross-sectional view of a base material 1, a cathode layer 2', and an electrolyte slurry 3s applied onto a surface of the cathode layer 2'.

In the manufacturing method of the first embodiment, in which the electrode body having the cathode layer, the anode layer, and the solid electrolyte layer disposed between the cathode layer and the anode layer is produced through S11 to S19, the electrolyte slurry is applied onto the surface of the cathode layer in S13, and thereby the solid electrolyte layer is formed. In the cathode layer after S11 and S12, the binder intertwines with the active material and the solid electrolyte particles, thereby exhibiting adhesion. FIG. 3A shows a cross section of the cathode layer and the base material after S11 and S12. FIG. 3B shows an enlarged cross section of the base material and the cathode layer shown in FIG. 3A and the electrolyte slurry applied onto the surface of the cathode layer. As shown in FIG. 3A, in the cathode layer 2' formed on the surface of the base material 1, the binder 2x, 2x, intertwines with the active material 2y, 2y, . . . and the solid electrolyte particles 2z, 2z, thereby exhibiting adhesion. If the solid electrolyte layer 3 is formed by applying the electrolyte slurry 3s on the surface of the cathode layer 2' configured in this manner, at least some of the binder 2x, 2x, . . . contained in the cathode layer 2' will absorb the solvent contained in the electrolyte slurry 3s and expand, and one end of some of the binder that has expanded will be disposed in the cathode layer 2' and the other end thereof will be disposed in the electrolyte slurry 3s. Then, the binder 2x, 2x, which is originally contained in the cathode layer 2' and the other end of which has now been disposed in the electrolyte slurry 3s will intertwine with the solid electrolyte particles 3z, 3z, . . . contained in the electrolyte slurry 3s. As a result, the cathode layer 2 and the solid electrolyte layer 3 can be bonded with each other via the binder 2x, 2x, . . . contained in the cathode layer 2', and therefore the adhesion between the cathode layer 2 and the solid electrolyte layer 3 can be improved. By improving the adhesion between the cathode layer 2 and the solid electrolyte layer 3, it is possible to reduce the resistance of lithium ion conduction at the interface between the cathode layer 2 and the solid electrolyte layer 3. Therefore, according to the manufacturing method of the first embodiment, an electrode body with reduced internal resistance can be manufactured.

Figure 4:
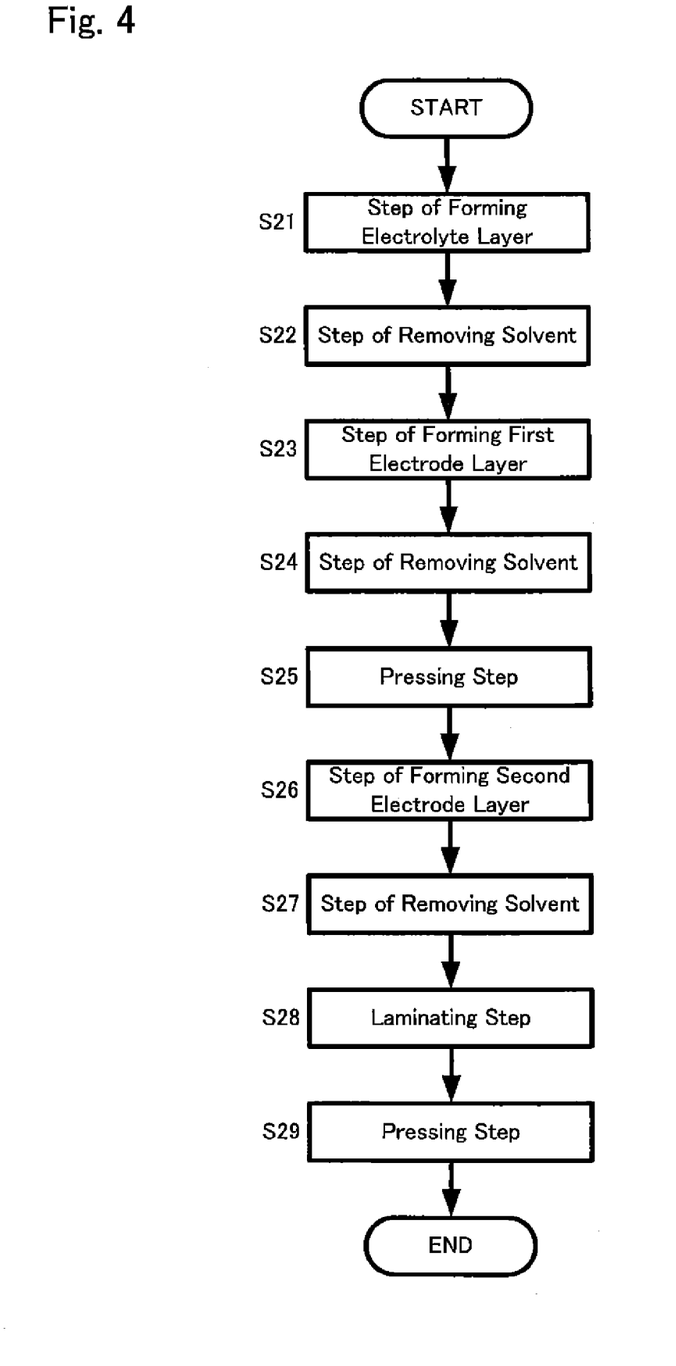
FIG. 4 is a flowchart showing a second embodiment of the method of manufacturing an electrode body of the present invention.

FIG. 4 is a flowchart showing the second embodiment of the method of manufacturing an electrode body of the present invention (hereinafter sometimes referred to a "manufacturing method of the second embodiment). As shown in FIG. 4, the manufacturing method of the second embodiment includes: a step S21 of forming an electrolyte layer; a step S22 of removing a solvent; a step S23 of forming a first electrode layer; a step S24 of removing a solvent; a pressing step S25; a step S26 of forming a second electrode layer; a step S27 of removing a solvent; a laminating step S28; and a pressing step S29.

The step S21 (hereinafter simply referred to as "S21") is a step of forming an electrolyte layer to constitute an electrode body (the electrolyte layer being a sheet-shaped electrolyte layer, hereinafter being referred to as a "solid electrolyte layer" in the descriptions of the manufacturing method of the second embodiment). S21 includes the steps of: dispersing an electrolyte having lithium ion conductivity and a binder into a solvent, thereby preparing an electrolyte slurry; and applying the electrolyte slurry thus prepared onto a surface of a base material.

In S21, the electrolyte, the binder, and the solvent may be adequately selected from known electrolytes, known binders, and known solvents respectively which can be employed in making the solid electrolyte layer of the lithium-ion secondary battery. Examples of the electrolyte, the binder, and the solvent may be those that can be employed in S13. In S21, the base material on which to apply the electrolyte slurry may be adequately selected from known base materials that enable the solid electrolyte layer formed to be peeled therefrom. Examples of the base material include known resin films such as polytetrafluoroethylene (PTFE) and polyethylene terephthalate (PET).

The step S22 (hereinafter simply referred to as "S22") is a step of removing the solvent contained in the electrolyte slurry that has been applied onto the base material in S21. Removing the solvent makes it possible to shape the solid electrolyte layer easily. In the manufacturing method of the second embodiment, the configuration of S22 is not particularly limited as long as the step enables removal of the solvent. For example, S22 can be a step of holding the base material on which the electrolyte slurry has been applied, for 60 minutes at 120° C. under atmospheric pressure.

The step S23 (hereinafter simply referred to as "S23") is a step of forming a first electrode layer to constitute an electrode body on a surface of the solid electrolyte layer from which the solvent has been removed in S22 (the first electrode layer being a sheet-shaped first electrode layer, hereinafter being referred to as a "cathode layer" in the descriptions of the manufacturing method of the second embodiment). S23 includes the steps of: dispersing an active material capable of absorbing and releasing lithium ions, an electrolyte having lithium ion conductivity, and a binder into a solvent, thereby preparing a first electrode slurry; and applying the first electrode slurry thus prepared onto the surface of the solid electrolyte layer.

In S23, the active material, the electrolyte, the binder, and the solvent may be adequately selected from known active materials, known electrolytes, known binders, and known solvents respectively which can be employed in making the cathode layer of the lithium-ion secondary battery. Examples of the active material, the electrolyte, the binder, and the solvent may be those that can be employed in S11. In S23, the method of applying the first electrode slurry is not particularly limited as long as it is a method that can be employed in applying a slurry. For example, a known method such as a doctor-blade method can be employed.

The step S24 (hereinafter simply referred to as "S24") is a step of removing the solvent contained in the first electrode slurry that has been applied onto the surface of the solid electrolyte layer in S23. Removing the solvent makes it possible to shape the cathode layer easily. In the manufacturing method of the second embodiment, the configuration of S24 is not particularly limited as long as the step enables removal of the solvent. For example, S24 can be a step of holding a structure having the first electrode slurry that has been applied onto the surface of the solid electrolyte layer, for 60 minutes at 120° C. under atmospheric pressure.

The step S25 (hereinafter simply referred to as "S25") is a step of pressing the solid electrolyte layer and the cathode layer formed on/above the base material, the solvent having been removed in S24, in a lamination direction of the solid electrolyte layer and the cathode layer. By pressing the solid electrolyte layer and the cathode layer, it is possible to easily improve the adhesion between the solid electrolyte layer and the cathode layer. In the manufacturing method of the second embodiment, the pressure to be applied to the solid electrolyte layer and the cathode layer in S25 is not particularly limited. It may be for example 50 MPa or more and 400 MPa or less. In the manufacturing method of the second embodiment, the time to apply the pressure (pressing time) in S25 is also not particularly limited. It may be for example 5 seconds or more and 300 seconds or less.

The step S26 (hereinafter simply referred to as "S26") is a step of forming a second electrode layer to constitute an electrode body (the second electrode layer being a sheet-shaped second electrode layer, hereinafter being referred to as an "anode layer" in the descriptions of the manufacturing method of the second embodiment). S26 is the same as S16, and therefore descriptions of S26 will be omitted.

The step S27 (hereinafter simply referred to as "S27") is a step of removing the solvent contained in the second electrode slurry that has been applied onto a base material in S26. S27 is the same as S17, and therefore descriptions of S27 will be omitted.

The step S28 (hereinafter simply referred to as "S28") is a step of laminating the cathode layer, the solid electrolyte layer, and the anode layer in such a manner that the solid electrolyte layer pressed in S25 is sandwiched by the cathode layer also pressed in S25 and the anode layer from which the solvent has been removed in S27. In S28, the base material on which the electrolyte slurry has been applied is peeled off from the solid electrolyte layer before the anode layer is disposed on one surface of the solid electrolyte layer. Thereafter, the anode layer is disposed on the surface of the solid electrolyte layer that used to have the base material peeled off as above. When the anode layer is formed by applying the second electrode slurry onto a surface of a copper foil in S26, a laminated body formed in S28 will have a structure in which the aluminum foil 1 is excluded from the laminated body 10 shown in FIG. 2. When making a lithium-ion secondary battery by using the laminated body formed in S28, a cathode current collector is first disposed in a manner to contact with the cathode layer, and thereafter a structure having the cathode current collector and the cathode layer is pressed in the pressing step S29 described below, accommodated into a known exterior material, sealed, and so on, thereby forming a lithium-ion secondary battery.

In the step S29 (hereinafter simply referred to as "S29") is a step of pressing the structure formed by disposing the cathode current collector on the cathode layer side of the laminated body formed in S28, in the lamination direction of the cathode layer, the solid electrolyte layer, and the anode layer. Pressing the structure not only makes it possible to easily improve the adhesion between the cathode current collector and the cathode layer, the adhesion between the anode current collector and the anode layer, and the adhesion between the anode layer and the solid electrolyte layer but also makes it possible to easily improve the adhesion between the cathode layer and the solid electrolyte layer. In the manufacturing method of the second embodiment, the pressure to be applied to the structure in S29 is not particularly limited as long as it is sufficient to improve the adhesion between the base material and the layer adjacent to each other and between the adjacent layers. It may be for example 100 MPa or more and 600 MPa or less. In the manufacturing method of the second embodiment, the time to apply the pressure (pressing time) in S29 is also not particularly limited. It may be for example 5 seconds or more and 30 seconds or less.

In the manufacturing method of the second embodiment, in which the electrode body having the cathode layer, the anode layer, and the solid electrolyte layer disposed between the cathode layer and the anode layer is produced through S21 to S29, the first electrode slurry is applied onto the surface of the solid electrolyte layer in S23, and thereby the cathode layer is formed. In the solid electrolyte layer subjected to S21 and S22, the binder intertwines with the solid electrolyte particles, thereby exhibiting adhesion. If the cathode layer is formed by applying the first electrode slurry on the surface of the solid electrolyte layer, at least some of the binder contained in the solid electrolyte layer will absorb the solvent contained in the electrode slurry and expand, and one end of some of the binder that has expanded will be disposed in the solid electrolyte layer and the other end thereof will be disposed in the electrode slurry. Then, the binder originally contained in the solid electrolyte layer and the other end of which has now been disposed in the electrode slurry will intertwine with the particles contained in the electrode slurry. As a result, the solid electrolyte layer and the cathode layer can be bonded with each other via the binder contained in the solid electrolyte layer, and therefore the adhesion between the solid electrolyte layer and the cathode layer can be improved. By improving the adhesion between the solid electrolyte layer and the cathode layer, it is possible to reduce the resistance of lithium ion conduction at the interface between the solid electrolyte layer and the cathode layer. Therefore, according to the manufacturing method of the second embodiment, an electrode body with reduced internal resistance can be manufactured.

In the above descriptions on the method of manufacturing an electrode body of the present invention, there have been introduced the embodiment of manufacturing an electrode body through the process of applying the electrolyte slurry onto the surface of the cathode layer (the first embodiment) and the embodiment of manufacturing an electrode body through the process of applying, onto the surface of the solid electrolyte layer, the first electrode slurry for making a cathode layer (the second embodiment); however, the present invention is not limited to these embodiments. In the method of manufacturing an electrode body of the present invention, the electrolyte slurry may be applied onto the surface of the anode layer, to manufacture an electrode body (the first embodiment), or the slurry for making an anode layer may be applied onto the surface of the solid electrolyte layer, to manufacture an electrode body (the second embodiment).

In the above descriptions, the configuration has also been introduced in which the step of removing the solvent is provided between the step of forming the first electrode layer and the step of forming the electrolyte layer; however, the present invention is not limited to this configuration. The method of manufacturing an electrode body of the present invention does not have to include the step of removing the solvent between the step of forming the electrode layer and the step of forming the electrolyte layer. However, in order to be able to easily shape the electrode layer and the electrolyte layer, and so on, it is preferable to include the step of removing the solvent between the step of forming the electrode layer and the step of forming the electrolyte layer.

As described above, in the method of manufacturing an electrode body of the present invention, the binder to be used in making the electrode slurry or the electrolyte slurry may be adequately selected from the binders that can be used in preparing an electrode layer or an electrolyte layer of a battery. In view of easily manufacturing an electrode body with reduced internal resistance and so on, it is preferable to employ butylene rubber as the binder.

In the method of manufacturing an electrode body of the present invention, the mass ratio among the active material, the electrolyte, the binder, and the solvent, which are used for preparing the electrode slurry (the first electrode slurry for making the cathode layer and the second electrode slurry for making the anode layer) may be adequately determined in consideration of the performance that should be exhibited by the electrode body made, the working property of the electrode body in manufacture thereof, and so on. In the method of manufacturing an electrode body of the present invention, based on 100 parts by mass of the electrode slurry, the amount of the active material contained in the electrode slurry is 60 parts by mass or more, preferably 80 parts by mass or more, in order to attain high electrode performance; and the amount of the active material in the electrode slurry is 98 parts by mass or less, preferably 95 parts by mass or less, in order to attain moldability and flexibility. In addition, the amount of the electrolyte in the electrode slurry is 5 parts by mass or more, preferably 10 parts by mass or more, in view of connecting the pathway of lithium ion conduction; and the amount of the electrolyte in the electrode slurry is 40 parts by mass or less, preferably 20 parts by mass or less, in view of attaining high electrode performance. Further, the amount of the binder in the electrode slurry is 0.1 parts by mass or more, preferably 1 part by mass or more, in order to attain moldability and flexibility; and the amount of the binder in the electrode slurry is 5 parts by mass or less, preferably 3 parts by mass or less, in view of connecting the pathway of lithium ion conduction. The amount of the solvent to be used in preparing the electrode slurry may be adequately adjusted based on the amount of the materials to be dispersed into the solvent.

Additionally, in the method of manufacturing an electrode body of the present invention, the mass ratio among the electrolyte, the binder, and the solvent used for preparing the electrolyte slurry for making the electrolyte layer may be adequately determined in consideration of the performance that should be exhibited by the electrode body made, the working property of the electrode body in manufacture thereof, and so on. In the method of manufacturing an electrode body of the present invention, based on 100 parts by mass of the electrolyte slurry, the amount of the electrolyte contained in the electrolyte slurry is 95 parts by mass or more, preferably 99 parts by mass or more, in view of connecting the pathway of lithium ion conduction; and the amount of the electrolyte contained in the electrolyte slurry is 99 parts by mass or less, preferably 95 parts by mass or less, in order to attain moldability and flexibility. In addition, the amount of the binder in the electrolyte slurry is 0.1 parts by mass or more, preferably 1 part by mass or more, in order to attain moldability and flexibility; and the amount of the binder in the electrolyte slurry is 5 parts by mass or less, preferably 3 parts by mass or less, in view of connecting the pathway of lithium ion conduction. Further, the amount of the solvent to be used for preparing the electrolyte slurry may be adequately adjusted based on the amount of the materials to be dispersed into the solvent.

As described above, in the manufacturing method of the second embodiment, the base material is removed after one of the electrode layers is formed on the surface of the solid electrolyte layer and before the other electrode layer is formed on the back face of the solid electrolyte layer opposite to the surface having the electrode layer already formed thereon. Therefore, in order to easily improve manufacturing efficiency of an electrode body by omitting this step, it is preferable to manufacture an electrode body by the method of manufacturing an electrode body of the first embodiment of the present invention.

In the above descriptions on the manufacturing method of the first embodiment, the configuration has been introduced in which S13 having the step of preparing the electrolyte slurry containing the binder dispersed therein is included; however, the manufacturing method of the first embodiment is not limited to this configuration. In the manufacturing method of the first embodiment, the electrolyte slurry to be applied onto the surface of the cathode layer (the first electrode layer) does not have to have the binder dispersed therein. Additionally, in the above descriptions on the manufacturing method of the second embodiment, the configuration has been introduced in which S23 having the step of preparing the first electrode slurry containing the binder dispersed therein is included; however, the manufacturing method of the second embodiment is not limited to this configuration. In the manufacturing method of the second embodiment, the first electrode slurry to be applied onto the surface of the solid electrolyte layer (the electrolyte layer) does not have to have the binder dispersed therein.

EXAMPLES

The following battery cells were made to evaluate the performance thereof: a lithium-ion secondary battery cell having an electrode body produced by the method of manufacturing an electrode body of the present invention (Example); and a lithium-ion secondary battery cell having an electrode body produced by a method different from the present invention (Comparative Example).

<Production of a Cathode Composite Layer>

In an inert gas (argon gas; the same shall apply hereinafter), a cathode composite slurry (electrode slurry) was prepared by using an active material, an electrolyte, a binder, and a solvent in the amounts shown below respectively, and was applied onto an aluminum foil by a doctor-blade method. Thereafter, the solvent was removed by holding the aluminum foil with the cathode composite slurry applied thereon for 60 minutes at 120° C. to dry it. In Example and Comparative Example, the compositions of the cathode composite slurry used for making a cathode layer were the same.

[Content of the Cathode Composite Slurry]
Active material (LiCoO$_2$): 1040 mg
Electrolyte (75Li$_2$S.25P$_2$S$_5$): 445 mg
Binder (butylene rubber): 15 mg
Solvent (heptane): 660 mg <Production of a Battery Cell>

Example

In the inert gas, an electrolyte slurry was prepared by using an electrolyte, a binder, and a solvent in the amounts shown below respectively, and was applied, by a doctor-blade method, onto the surface of the cathode composite layer, from which the solvent had been removed. Thereafter, the solvent in the electrolyte slurry was removed by holding the resultant for 60 minutes at 120° C. to dry it. Then the cathode composite layer having a solid electrolyte layer formed thereon was cut out into a size of 1 cm$^2$, and the cathode composite layer cut out was pressed at a pressure of 98 MPa for 30 seconds.

[Content of the Electrolyte Slurry]
Electrolyte (75Li$_2$S.25P$_2$S$_5$): 1040 mg
Binder (butylene rubber): 10 mg
Solvent (heptane): 1450 mg On the other hand, in the inert gas, an anode composite slurry (electrode slurry) was prepared by using an active material, an electrolyte, a binder, and a solvent in the amounts shown below respectively, and was applied onto a copper foil by a doctor-blade method. Thereafter, the solvent was removed by holding the copper foil with the anode composite slurry applied thereon for 60 minutes at 120° C. to dry it. Then, the anode composite layer from which the solvent had been removed was cut into a piece having a size of 1 cm$^2$.

[Content of the Anode Composite Slurry]
Active material (graphite): 1040 mg
Electrolyte (75Li$_2$S.25P$_2$S$_5$): 1040 mg
Binder (butylene rubber): 21 mg
Solvent (heptane): 1400 mg The pressed cathode composite layer having the solid electrolyte layer formed thereon and the anode composite layer that had been cut out were laminated such that the solid electrolyte layer was disposed between the cathode composite layer and the anode composite layer. Then, the laminated body thus obtained was pressed at a pressure of 421.4 MPa for 30 seconds, to thereby produce a battery cell of the Example.

Comparative Example

In the inert gas, a solid electrolyte layer was made by pressing an electrolyte (65 mg of Li$_7$P$_3$S$_{11}$) at a pressure of 98 MPa for 30 seconds. Further, a cathode composite layer from which a solvent had been removed was cut into a size of 1 cm$^2$. Then, the cathode composite layer cut out was disposed on a surface of the solid electrolyte layer, and the resultant was pressed at a pressure of 98 MPa for 30 seconds. In addition, an anode composite (6.0 mg of graphite and 60 mg of Li$_7$P$_3$S$_{11}$) was arranged on the side of the solid electrolyte layer opposite to the side having the cathode composite layer disposed, so that the solid electrolyte layer was sandwiched by the cathode composite layer and the anode composite layer disposed on a copper foil. Thereafter, the resultant was pressed at a pressure of 421.4 MPa for 30 seconds, to thereby produce a battery cell of the Comparative Example.

<Evaluation of the Performance>

The battery cells of the Example and the Comparative Example made were charged and discharged in a state of charge (SOC) of 0% to 100%, and thereafter charged to a state of charge of 80%. Then, the resistance of the battery cells was measured by alternating current impedance measurement. The discharge capacity per battery cell was also measured. The results are shown in Table 1.

TABLE 1

|  | Reaction Resistance [Ω] | Discharge Capacity [mAh] |
| --- | --- | --- |
| Example | 34.1 | 101.6 |
| Comparative Example | 40.3 | 91.1 |

As shown in Table 1, whereas the reaction resistance of the battery cell of the Example was 34.1Ω, that of the battery cell of the Comparative Example was 40.3Ω. In this way, it was possible to reduce the reaction resistance of the battery cell of the Example having the electrode body produced by the method of manufacturing an electrode body of the present invention, by about 15.4% compared with the reaction resistance of the battery cell of the Comparative Example. Further, as shown in Table 1, whereas the discharge capacity of the battery cell of the Comparative Example was 91.1 mAh, that of the battery cell of the Example was 101.6 mAh. In this way, it was possible to increase the discharge capacity of the battery cell of the Example by about 11.5%.

DESCRIPTION OF THE REFERENCE NUMERALS

1 aluminum foil (base material, cathode current collector)
2, 2' cathode layer (electrode layer)
2x binder
2y active material
2z, 3z solid electrolyte particle
3 solid electrolyte layer (electrolyte layer)
3s electrolyte slurry
4 anode layer (electrode layer)
5 copper foil (base material, anode current collector)
6 electrode body
10 laminated body

The invention claimed is:

1. A method of manufacturing an electrode body which comprises an electrode layer and an electrolyte layer disposed on the electrode layer, the method comprising:

an electrode layer forming step of dispersing at least an active material releasing or absorbing and releasing a metal ion, an electrolyte having conductivity for the metal ion, and a binder into a solvent, to prepare an electrode slurry, and applying the electrode slurry onto a base material, thereby forming the electrode layer containing the binder;

an electrolyte layer forming step of dispersing at least an electrolyte having conductivity for the metal ion into a solvent to prepare an electrolyte slurry, and applying the electrolyte slurry onto a surface of the electrode layer, wherein at least some of the binder contained in the electrode layer absorbs the solvent contained in the electrolyte slurry and expands and one end of some of the binder that has expanded is disposed in the electrode layer and the other end thereof is disposed in the electrolyte slurry, thereby forming the electrolyte layer on the surface of the electrode layer;

a step of removing the solvent contained in the electrode layer; and a step of removing the solvent contained in the electrolyte layer, wherein the electrolyte is an oxide solid electrolyte or a sulfide solid electrolyte, and the binder is butylene rubber.

2. The method of manufacturing an electrode body according to claim 1, further comprising the step of removing the solvent contained in the electrode layer by drying the electrode layer, between the electrode layer forming step and the electrolyte layer forming step.

3. A method of manufacturing an electrode body which comprises an electrode layer and an electrolyte layer disposed on the electrode layer, the method comprising:

an electrolyte layer forming step of dispersing at least a binder and an electrolyte having metal ion conductivity into a solvent, to prepare an electrolyte slurry, and applying the electrolyte slurry onto a base material, thereby forming the electrolyte layer containing the binder;

an electrode layer forming step of dispersing at least an active material releasing or absorbing and releasing the metal ion, and an electrolyte having conductivity for the metal ion into a solvent, to prepare an electrode slurry, and applying the electrode slurry onto a surface of the electrolyte layer, wherein at least some of the birder contained in the electrode layer absorbs the solvent contained in the electrolyte slurry and expands, and one end of some of the binder that has expanded is disposed in the electrode layer and the other end thereof is disposed in the electrolyte slurry, thereby forming the electrode layer on the surface of the electrolyte layer;

a step of removing the solvent contained in the electrode layer; and a step of removing the solvent contained in the electrolyte layer, wherein the electrolyte is an oxide solid electrolyte or a sulfide solid electrolyte, and the binder is butylene rubber.

4. The method of manufacturing an electrode body according to claim 3, further comprising the step of removing the solvent contained in the electrolyte layer by drying the electrolyte layer, between the electrolyte layer forming step and the electrode layer forming step.

* * * * *